United States Patent [19]
Yen

[11] Patent Number: 5,092,913
[45] Date of Patent: Mar. 3, 1992

[54] HIGH CAPACITY LOW RESISTANCE VACUUM CLEANER

[76] Inventor: Richard C. K. Yen, 1440 E. Comstock Ave., Glendora, Calif. 91740

[21] Appl. No.: 616,771

[22] Filed: Nov. 20, 1990

[51] Int. Cl.$^5$ .............................................. B01D 46/04
[52] U.S. Cl. .......................................... 55/97; 55/213; 55/309; 55/312; 55/345; 55/346; 55/429; 55/472; 55/484
[58] Field of Search ...................... 55/96, 97, 212, 213, 55/215, 218, 309, 312, 343, 346, 429, 472, 484, 493, DIG. 3

[56] References Cited

U.S. PATENT DOCUMENTS

| | | | |
|---|---|---|---|
| 3,590,562 | 7/1971 | Byers et al. | 55/484 |
| 3,609,190 | 9/1952 | Jackson | 55/DIG. 3 |
| 3,951,623 | 4/1976 | Furstenberg | 55/96 |
| 4,197,098 | 4/1980 | Stiehl et al. | 55/484 X |
| 4,507,130 | 3/1985 | Roth | 55/96 |
| 4,515,609 | 5/1985 | Cuvelier | 55/343 X |
| 4,692,173 | 9/1987 | Roos | 55/96 |
| 4,701,192 | 10/1987 | Burke | 55/213 |

Primary Examiner—Charles Hart
Attorney, Agent, or Firm—Thomas I. Rozsa

[57] ABSTRACT

A multi-compartment vacuuming machine which maintains a high flow rate capacity and low resistance from obstructions in the flow path through arrangement of the multiplicity of vacuum canisters in parallel so that obstructed flow in one filter canister will not impair the flow through the remainder of the filter canisters. The flow path of the dirty fluid is arranged such that there is a straight line from the dirty fluid to the most distal filter canister so that the most distal canister fills up first and then intermediate filter canisters are filled. The transverse path leads from the main dirty inlet flow tube to the various filter canisters. In the preferred embodiment, the canister inlet flow tube to each filter canister is generally perpendicular to the dirty air inlet tube and the vacuum suction motor is remote from the most distal of the canisters. Variations on this embodiment include having the canister inlet flow tubes to the various filter canisters set at an angle relative to the dirty air inlet tube, having the vacuum suction motor located adjacent the most distal filter canister, and having the flow path from the dirty air inlet directed in a straight line to one of the filter canisters and therefore generally perpendicular to the flow path of the canister inlet tubes of the other canisters. When a filter canister is filled with particulates, means are provided to shut off air flow to that filter canister and further means are provided to disengage the filter or the filter canister from the vacuum apparatus so that it can be cleaned and if desired the filter can be replaced. In an alternative embodiment, instead of a multiplicity of filter canisters there is a multiplicity of filter compartments in one large enclosure and one sheet filter is used for all compartments.

7 Claims, 6 Drawing Sheets

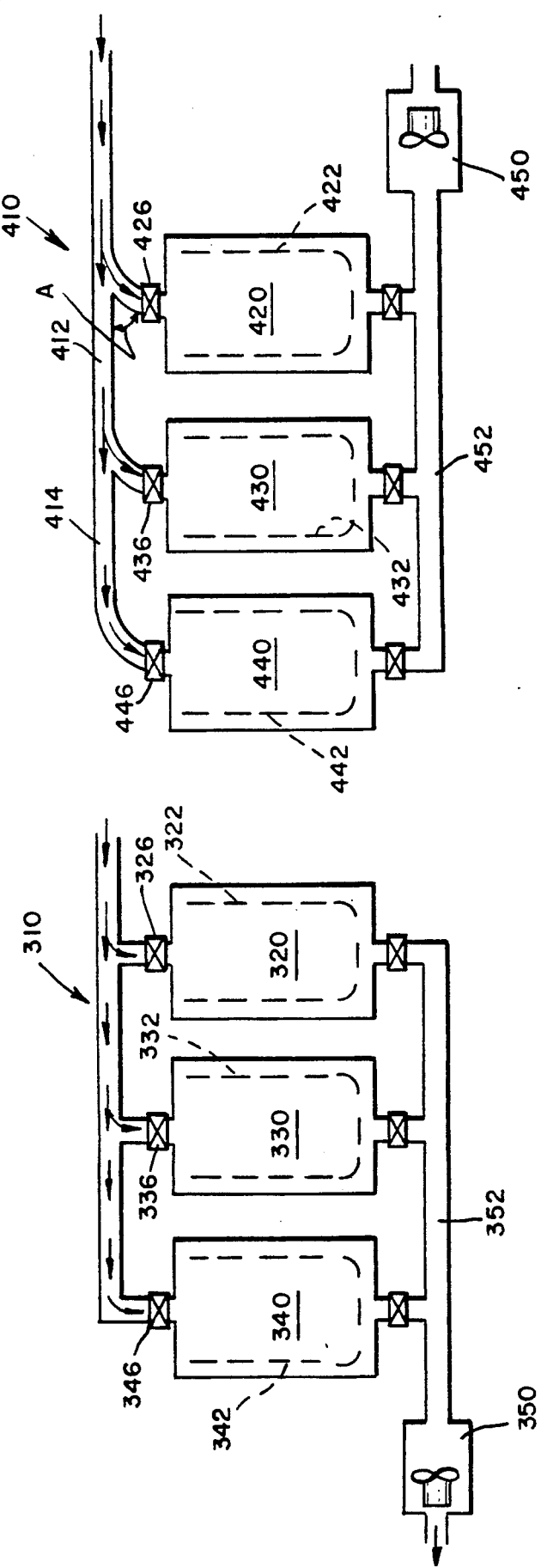

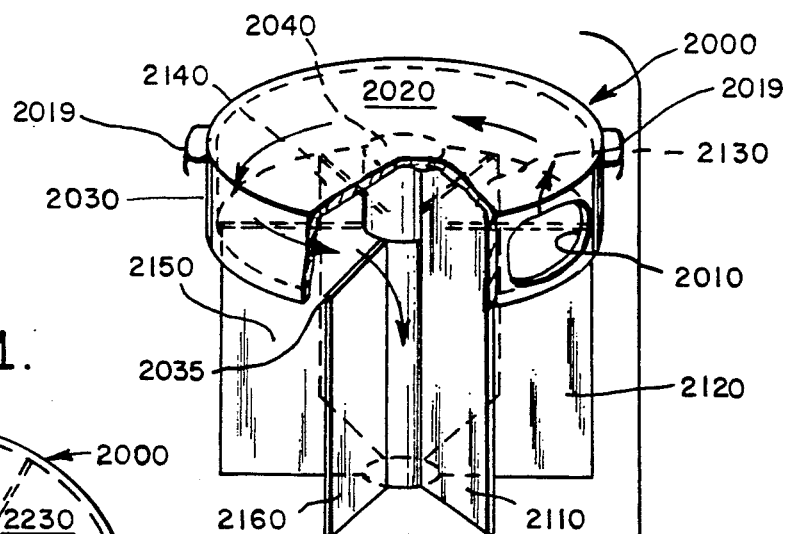
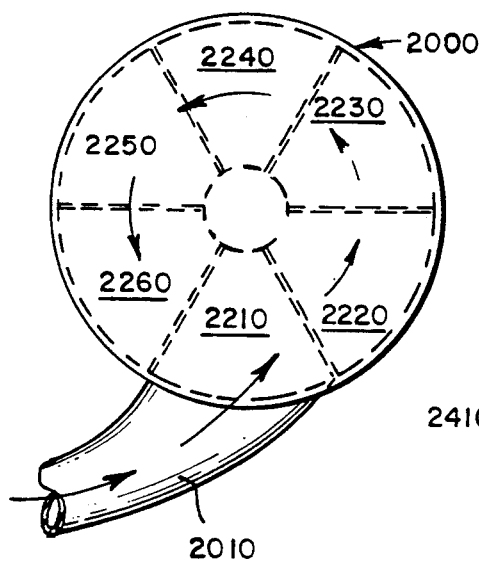
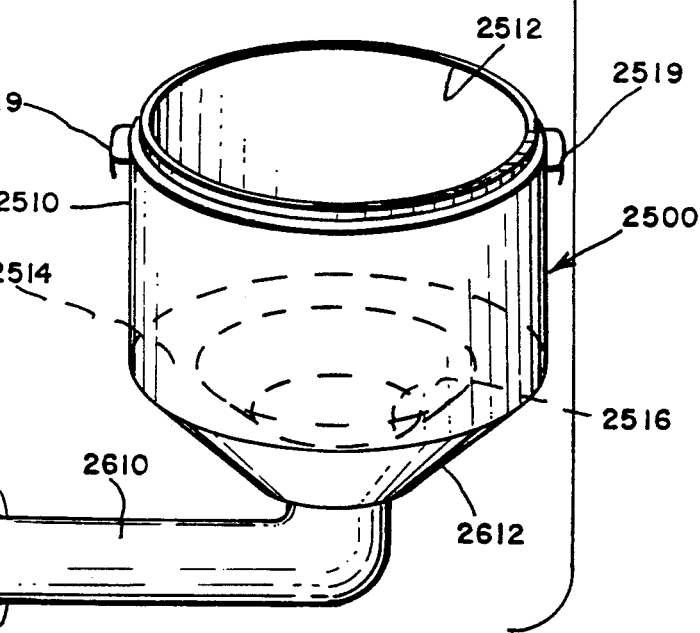
Fig. 11.
Fig. 10.

HIGH CAPACITY LOW RESISTANCE VACUUM CLEANER

BACKGROUND OF THE INVENTION

1. Field of the Invention

The present invention relates to an improved vacuum cleaning apparatus and method wherein the vacuum cleaner does not need to be shut off in order to remove the dirt filled container and can in fact continue vacuum suction at an undiminished rate during removal of a vacuum filter canister. The present invention further provides a multiplicity of dirt capturing chambers which can be removed sequentially and in rotation without affecting the vacuuming process, thereby increasing to infinity the cleaning capacity of the vacuum cleaner system. The present invention further relates to improvements in a present co-pending patent application by inventor Richard C. K. Yen, namely, patent application Ser. No. 07/407,414 filed 09/14/89 and entitled "Apparatus For Vacuum Cleaner With Uninterrupted And Undiminished Performance" (hereafter "'414 application").

2. Background of the Invention

The closest technology to the present invention is the technology disclosed and claimed in the '414 application in which a vacuum cleaner utilized a multiple chamber arrangement in series to allow: 1) continuous vacuuming while changing the filter bags that are filled, 2) first collection of dirt in the proximal chamber which is closest to the inflow of dirty air, and 3) negative pressure to loosen the dirt collected in any chamber to facilitate continuous vacuuming efficiency in the same chamber.

One drawback of the apparatus in the '414 application is caused by the nature of the in-series fluid flow arrangement. The in-series fluid flow configuration of the multiplicity of vacuum canisters permits obstruction of any part of the pathway of flow of dirty fluid to obstruct the flow of dirty fluid distal to or beyond the site of obstruction. There exists the need for other arrangements to achieve the same objective of 1) high efficiency filtration, 2) shifting to new areas of unobstructed filter membrane area upon progressively lower efficiency of filtration at used filter membrane areas, and 3) allowing a continuous process of vacuuming while changing filter bags in chambers that have been nearly or completely filled.

In addition, because the proximal or first chamber in devices of the '414 application is closest to the motor or vacuuming source, it is difficult to change or clean the dirty first chamber. To change the entire canister holding the first chamber, at least three points must be disconnected. There is a need for an improved apparatus which simplifies the number of points on the device which must be disconnected when removing a filtering member.

SUMMARY OF THE PRESENT INVENTION

The present invention is a multi-compartment vacuuming machine which maintains a high flow rate and low resistance to flow in the flow path through arrangement of the multiplicity of vacuum canisters in parallel so that obstructed flow in one filter canister will not impair the flow through the remainder of the filter canisters. The flow path of the dirty fluid is arranged such that there is a straight line from the dirty fluid to the most distal filter canister so that the most distal canister fills up first and then intermediate filter canisters are filled. The transverse path leads from the main dirty inlet flow tube to the various filter canisters. The multiple-canister design allows large volumes of dirty fluid (gas or liquid) to be filtered. The design also allows any number of used canisters to be replaced on a rotational basis; hence the unlimited capacity for capturing the dirt.

In the preferred embodiment, the inlet flow tube to each filter canister is generally perpendicular to the dirty air inlet (or dirty fluid) tube and the vacuum suction motor is remote from the most distal of the canisters. The most distal canister is defined as the canister farthest away from the inlet flow tube. Variations on this embodiment include having the inlet flow tubes to the various filter canisters set at an angle relative to the dirty air inlet tube, having the vacuum suction motor located adjacent the most distal filter canister, and having the flow path from the dirty air inlet directed in a straight line to one of the filter canisters and therefore generally perpendicular to the flow path leading to the inlet tubes of the other canisters. When a filter canister is filled with dirt and debris, means are provided to shut off air flow to that filter canister and further means are provided to disengage the filter canister from the vacuum apparatus so that it can be cleaned and if desired the filter or the entire canister containing the filter can be replaced. In an alternative embodiment, instead of a multiplicity of physically separate filter canisters there is a multiplicity of filter compartments in one large enclosure and one sheet filter is used for filtering dirty fluid coming from all compartments.

It has been discovered, according to the present invention, that if a multiplicity of canisters are aligned in a row and connected in parallel through a fluid flow hose, with each canister having a canister inlet port and a canister outlet port, and each canister further comprises an internal filter means onto which flows fluid (gaseous or liquid) containing the particulates (in solid or dissolved form), then the efficiency of the vacuuming system is very high since a selected one of the canisters can be made to fill up first which can be subsequently removed while the remainder of the system is operational and permits vacuuming to continue.

It has additionally been discovered, according to the present invention, that if the vacuum filter canisters are connected in parallel, then an obstruction at one location of the flow path will not impede flow through the remainder of the flow path. Therefore, if a large piece of debris clogs one of the flow paths to a filter canister, the remaining filter canisters are still operational.

It has also been discovered, according to the present invention, that if the flow path configuration is rearranged such that the filter canister which is most distal from the vacuum suction motor is caused to fill up first, then the removal of the vacuum suction canister to be filled first is greatly simplified since removal is not obstructed by the motor housing.

It has further been discovered, according to the present invention, that a series of vacuum canisters with each canister containing a filter, when arranged in parallel, can cause the air flow path to go through each respective vacuum filter canister without any negative pressure lifting dirt from one vacuum canister to an adjacent canister. The presence of only positive pressure allows the dirt and debris which has collected on the filter to stay in the same chamber and therefore does not cause agitation of material in the overall air flow path. Positive pressure is defined as any pressure gradient that will promote movement of particulate matter (in solid or dissolved form, impermeable to the pores of the filter) onto the retention surface of the filter. Negative pressure is defined as any pressure gradient (regardless of its magnitude as compared to atmospheric pressure) that causes movement of particulates in a direction away from the retention surface of the filter. The retention surface of the filter is that surface which faces the dirty fluid, opposite to the filtrate surface which faces the filtrate.

It has also been discovered, according to the present invention, that if the multiplicity of vacuum chambers is replaced by a multiplicity of compartments housed in one large container, then a single sheet filter can be used to filter all of the compartments, and replacement of said single filter will provide clean filter area for all compartments, thereby simplifying the entire operation.

It has additionally been discovered, according to the present invention, that if a special structure of a multiplicity of compartments is adapted to the size and shape of a generally cylindrical filter bag, then a conventional vacuum cleaner system with a generally cylindrical canister for containing the generally cylindrical filter bag can be converted into a multi-chamber vacuum system.

It is therefore an object of the present invention to provide a vacuum cleaner with a high air flow rate, low resistance to air flow and large capacity for collection of particulate matter, even if an obstruction should clog a portion of the air flow path.

It is a further object of the present invention to provide a vacuum cleaner with a multiplicity of distinct and separate chambers with the air flow arranged so that the flow rate is not identical among the chambers, thereby permitting different chambers to sequentially fill up with dirt and further permitting removal of one or more of the chambers while the system is still operational with vacuum continuing and debris shifting to and filling up one or more of the remaining operational chambers.

It is an additional object of the present invention to provide a vacuum cleaner assembly with a multiplicity of sequentially arranged independent canisters with the air flow in parallel among the canisters, and with the flow arranged such that the filter canister most distal from the vacuum suction motor fills up first so that it is easiest to remove.

It is another object of the present invention to provide a vacuum cleaner assembly with a multiplicity of sequentially arranged independent canisters with the air flow in parallel among the canisters, and with the flow arranged such that air flow to one or more of the canisters can be shut off while air flow to the remaining canisters is operational, and further provide means to disengaged one or more canisters so it or they may be cleaned while the remainder of the system remains operational.

It is a further object of the present invention to provide a vacuum cleaner assembly wherein the multiplicity of separate locations is a multiplicity of separate compartments housed in one enclosure so that a filter sheet can be used to filter all compartments.

It is also an object of the present invention to provide a special structure which has a multiplicity of compartments and is adapted to the size and shape of a generally cylindrical filter bag, so a conventional vacuum cleaner system with a generally cylindrical canister for containing the generally cylindrical filter bag can be converted into a multi-chamber vacuum system.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 3 is a schematic flow diagram of a first alternative embodiment of the present invention vacuum cleaner, illustrating the general configuration of the apparatus and further illustrating the principles by which this embodiment operates.

FIG. 4 is a schematic flow diagram of a second alternative embodiment of the present invention vacuum cleaner, illustrating the general configuration of the apparatus and further illustrating the principles by which this embodiment operates.

FIG. 10 is an exploded view of an alternative embodiment of the present invention which has a special structure of a multiplicity of compartments adapted to the size and shape of a generally cylindrical filter bag, to convert a conventional vacuum cleaner system with a generally cylindrical canister for containing the generally cylindrical filter bag into a multi-chamber vacuum system.

FIG. 11 is a top view of the special structure of a multiplicity of compartments shown in FIG. 10 at 2000.

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
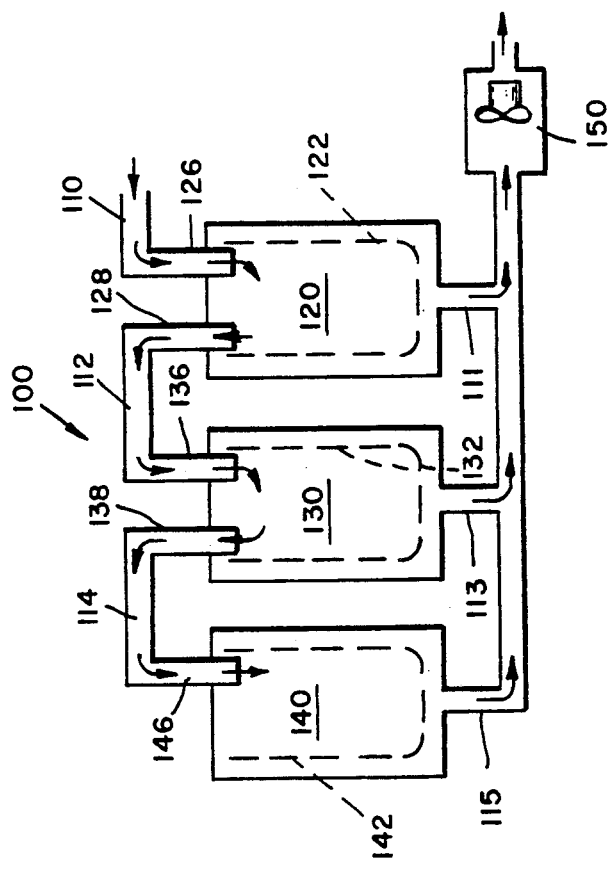
FIG. 1 is a schematic flow diagram of the prior invention embodied in the '414 application.

To fully appreciate the significance of the present invention improvement, the principles of the '414 application device will be discussed first. Referring to FIG. 1, there is shown a schematic flow diagram of the '414 application device 100. Three canisters are illustrated but of course any multiplicity of canisters can be utilized with the '414 application device. The illustration in FIG. 1 has three canisters 120, 130 and 140 respectively, with each canister having a respective filter membrane 122, 132 and 142. The first canister 120 has dirty air inlet 126, dirty air exit outlet 128 and clean air exit 111. Similarly, second canister 130 has dirty air inlet 136, dirty air exit outlet 138 and clean air exit 113. Third canister 140 has dirty air inlet 146 and clean air outlet 115. The fundamental principal of the prior art device which is improved upon by the present invention is that the prior art device 100 has the fluid flow in series through the canisters 120, 130 and 140 so that air from the dirty inlet 110 to the suction motor 150 must at least partially pass through all of the canisters. The dirty air is sucked in at inlet 110 and passes through dirty air inlet 126 into canister 120 where positive pressure forces air and particulates onto filter membrane 122 and clean air exists through clean air outlet 111, however negative pressure pulling air and particulates away from filter membrane 122 causes some of the air to go through dirty air exit outlet 128, along air duct 112 and through dirty air inlet 136 into canister 130 where positive pressure forces air and particulates onto filter membrane 132 and clean air exits through clean air outlet 113. However, negative pressure pulling air and particulates away from filter membrane 132 causes some of the air to go through dirty air exit outlet 138, along air duct 114 and through dirty air inlet 146 into canister 140 where positive pressure forces air and particulates onto filter membrane 142 and clean air exits through clean air outlet 115. As resistance on a membrane builds up due to particulate accumulation thereon, negative pressure increases to pull air and debris into the next canister. Since the suction motor 150 is closest to first canister 120, most of the dirt will build up in first canister 120 because the resistance to air flow is lowest there. Since this canister 120 is closest to motor 150, it is the most difficult to remove. In addition, since the canisters are arranged so that the fluid flow is in series from one canister to the next, if there is an obstruction such as impacted dirt anywhere along any of the flow paths, (e.g. at 112), the portion of the apparatus distal to the obstruction will become non-functional (e.g. canister 130 and 140). As discussed in the text of the '414 Application, the removal of a filled canister requires disconnection at three locations (e.g. tube 126, 128 and 111 in order to remove cannister 120), or else a special lid which separates the filter portion from the inlet and exit tubes (such as 126 and 128) must be inserted prior to removal of the dirt, which is a cumbersome operation.

Figure 2:
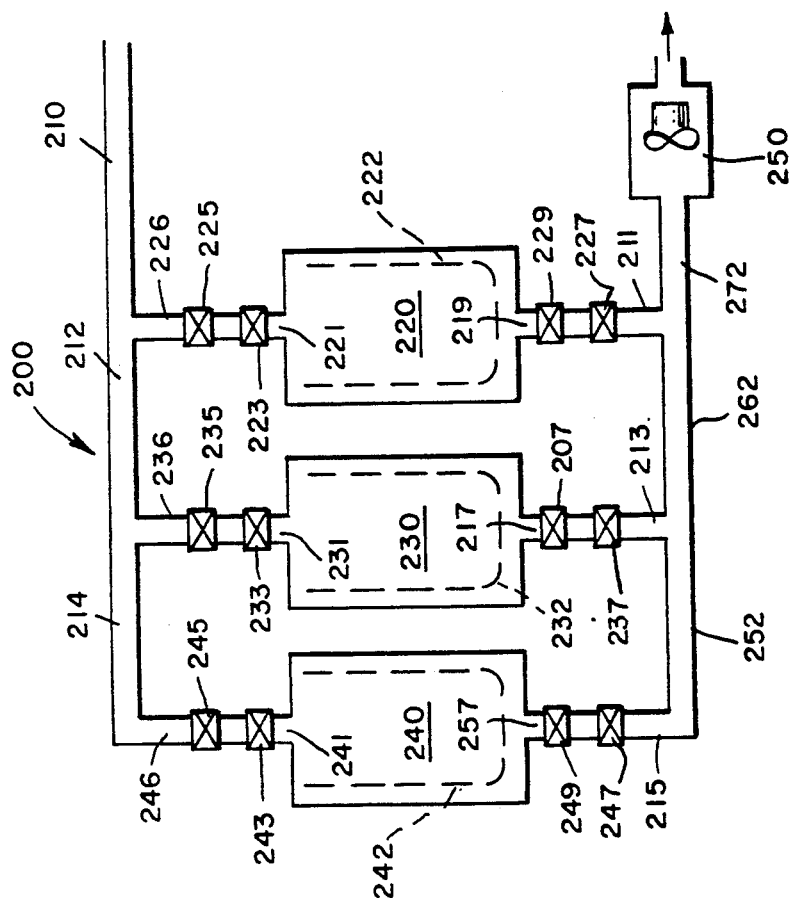
FIG. 2 is a schematic flow diagram of the preferred embodiment of the present invention vacuum cleaner, illustrating the general configuration of the apparatus and further illustrating the principles by which the present invention operates.

The fundamental principle of the present invention is illustrated in the flow diagram of FIG. 2. The improved vacuum cleaner apparatus 200 can once again include any multiplicity of canisters. The particular embodiment in FIG. 2 shows three canisters 220, 230 and 240. First canister 220 has filter 222 inside it, dirty air canister inlet tube 226 and clean air canister exit tube 211. Similarly, second canister 230 has filter 232 inside it, dirty air canister inlet tube 236 and clean air canister exit tube 213 and third canister 240 has filter 242 inside it, dirty air canister inlet tube 246 and clean air canister exit tube 215. One fundamental difference between the present invention vacuum cleaner 200 and the '414 application device 100 is that there is no exit tube leading from one canister to the adjacent canister. Therefore, there is no negative pressure to pull air and particulates away from a filter membrane. Since there is no such continuous flow, the canisters are all arranged in parallel rather than in series. Therefore, if one canister becomes filled or occluded, the remaining canisters are still fully operational because the air flow among the canisters is in parallel, not in series. The dirty air enters through dirty air inlet 210 and since the flow is in a straight line, the preferred path for the fluid flow is to travel along tube sections 212 and 214 and then go to dirty air canister inlet tube 246 and into canister 240 where particulates are forced by positive pressure onto filter membrane 242 and clean air exits through clean air canister exit tube 215 and then along return tube 252 to suction motor 250. Some of the air will go through dirty air canister inlet tube 236 where it travels into second canister 230 and onto filter member 232. Clean air exits through clean air canister exit tube 213 and then travels through return tube 262 to motor 250. Finally, some of the air goes through dirty air canister inlet tube 226, into first canister 220 and onto filter membrane 222. The air exits through clean air canister exit 211 and to return tube 272 to motor 250. As illustrated in FIG. 2, the branch dirty air canister inlet tubes 226, 236 and 246 are at generally right angles to the dirty air inlet tube 210 and its straight line sections 212 and 214. The fact that there is a straight line along sections 210, 212 and 214 causes the air to go first along this straight line instead of branching off into an inlet tube which is set at an angle to it, especially ones set at generally right angles to it. Therefore, even though the shortest distance is from dirty air inlet tube 210 to branch canister inlet tube 226, air will go along the straight line, bypassing canister inlet tube 226, 236 and enter first to dirty air canister inlet tube 246. Dirty air will go to branch dirty air canister inlet tube 236 and 226 only when the resistance to flow has substantially increased in canister 240. Experimental data collected have shown that the reduction in resistance due to a short distance (such as between tube 226 and the suction service motor 250) is not able to overcome the tendency of dirty fluid in such operating conditions to flow in a straight line. Therefore, delivery to the most distal canister 240 is greater than to the more proximal canister 220 and so more dirt collects in the most distal chamber 240. After dirt starts to accumulate in the most distal chamber 240, the resistance there increases. At sufficiently high resistance, dirt starts to enter the next chamber which has the least resistance or comparable resistance. When a canister is sufficiently filled with debris and dirt, it is removed.

Means are provided to seal off the air flow before removal of dirty canisters. A pair of valves are located at the ends of the dirty air canister inlet tube and the clean air canister exit tube leading from the particular canister to seal off air flow into or out of that canister. Shutoff valve 225 shuts off air flow through dirty air canister inlet tube 226 and allows the air in tube 210 to enter entirely to tube 212. Shutoff valve 227 shuts off air flow through clean air canister exit tube 211 and allows air to pass from tube 262 entirely to motor 250. Similarly, shutoff valve 235 shuts off air flow through dirty air canister inlet tube 236 and shutoff valve 237 shuts off air flow through clean air canister exit tube 213. Shutoff valve 245 shuts off air flow through dirty air canister inlet tube 246 and shutoff valve 247 shuts off air flow through clean air canister exit tube 215.

Means for removing the canister are positioned adjacent the respective shutoff valves but closer to the canisters so that there is no leak when canisters are disconnected or opened. One such means is a threaded coupling which intermeshes threads on the dirty air canister inlet tubes and on the clean air canister exit tubes. Dirty air canister inlet tube 246 has threads 241 which are joined together by coupling 243. Clean air canister exit tube 215 has threads 257 which are joined together by coupling 249. To remove canister 240, couplings 243 and 249 are unscrewed and threaded away from the joining locations so that the balance of canister inlet and canister exit tubes and the canister 240 can be removed. Since the shutoff valves 245 and 247 have been used to prevent air flow into the canister, the canister 240 can be removed without loss of air flow. Similarly, dirty air canister inlet tube 236 has threads 231 which are joined together by coupling 233 and clean air canister exit tube 213 has threads 217 which are joined together by coupling 207. To remove canister 230, couplings 233 and 207 are unscrewed and threaded away from the joining locations so that the balance of canister inlet and canister exit tubes and the canister 230 can be removed. Since the shutoff valves 235 and 237 have been used to prevent air flow into the canister, the canister 230 can be removed without loss of air flow. Similarly, dirty air canister inlet tube 226 has threads 221 which are joined together by coupling 223 and clean air canister exit tube 211 has threads 219 which are joined together by coupling 229. To remove canister 220, couplings 223 and 229 are unscrewed and threaded away from the joining locations so that the balance of canister inlet and canister exit tubes and the canister 220 can be removed. Since the shutoff valves 225 and 227 have been used to prevent air flow into the canister, the canister 220 can be removed without loss of air flow. Since the most distal canister 240 is farthest from motor 250, it is easiest to remove. Since this is the canister which also fills up with dirt first, the canister most likely to be filled is also the easiest to remove, thereby providing another significant advantage to the present invention.

Figure 5:
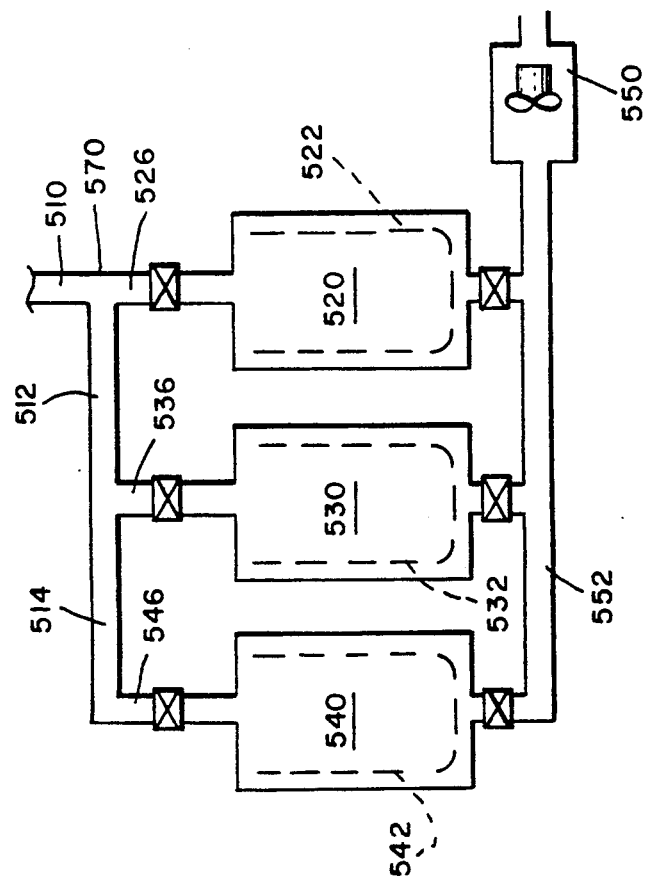
FIG. 5 is a schematic flow diagram of a third alternative embodiment of the present invention vacuum cleaner, illustrating the general configuration of the apparatus and further illustrating the principles by which this embodiment operates.

Various alternative embodiments to the present invention are illustrated in FIGS. 3 through 5. Referring to FIG. 3, there are three canisters 320, 330 and 340 with respective filters 322, 332 and 342 with dirty air inlet passage 310 and return air tube 352 leading to motor 350. There are also comparable means for shuting off air flow through each respective canister such as valves 326, 336, and 346, and for disengaging each respective canister from the unit. In the alternative embodiment illustrated in FIG. 3, the structure is identical to the preferred embodiment illustrated in FIG. 2 with the exception that the motor 350 is located adjacent the canister 340 which is most distal from dirty air inlet 310 and therefore most likely to fill up first. This arrangement may confer a slightly greater pressure gradient across the canister 340 compared to canister 240 due to the proximity of motor 350 to canister 340. However, one disadvantage is that the canister 340 most likely to fill up first is closest to motor 350, which makes removal of canister 340 more difficult than the preferred embodiment as illustrated in FIG. 2.

Referring to FIG. 4, there are three canisters 420, 430 and 440 with respective filters 422, 432 and 442 with dirty air inlet passage 410 and return air tube 452 leading to motor 450. There are also comparable means for shuting off air flow through each respective canister such as valves 426, 436, and 446, and for disengaging each respective canister from the unit. In the alternative embodiment illustrated in FIG. 4, the structure is identical to the preferred embodiment illustrated in FIG. 2 with the exception that each respective dirty air canister inlet tube, 426, 436 and 446 is set at an angle "A" relative to the straight line dirty air inlet tube 410 and its sections 412 and 414. Since the angle "A" is less than 90 degrees, more air will flow into first canister 420 than into first canister 220 and similarly more air will flow into second canister 430 than into second canister 230 and so the result will be the intermediate canisters will fill up faster. This embodiment is advantageous to provide a slightly more even rate of filling up of the canisters rather than having the last canister (440 and 240 respectively) substantially filled up first before much dirt goes into the intermediate canisters.

Referring to FIG. 5, there are three canisters 520, 530 and 540 with respective filters 522, 532 and 542 with dirty air inlet passage 510 and return air tube 552 leading to motor 550. There are also dirty air canister inlet tubes 526, 536 and 546 leading to each respective canister. There are also comparable means for shuting off air flow through each respective canister and for disengaging each respective canister from the unit. In the alternative embodiment illustrated in FIG. 5, the structure is identical to the preferred embodiment illustrated in FIG. 2 with the exception that dirty air inlet tube 510 is connected with a "T" connection 570 so that there is a straight line leading to canister inlet tube 526 and the dirty air inlet tube 510 is at right angles to the inlet tube passages 512 and 514. In this embodiment, first canister 520 will fill up first and then last canister 540 will fill up and then the intermediate canister 530 will fill up. Other "T" connections to other canisters are also within the spirit and scope of the present invention, thereby allowing the one with a straight line path from the dirty air inlet passage 510 to fill up first.

Figure 6:
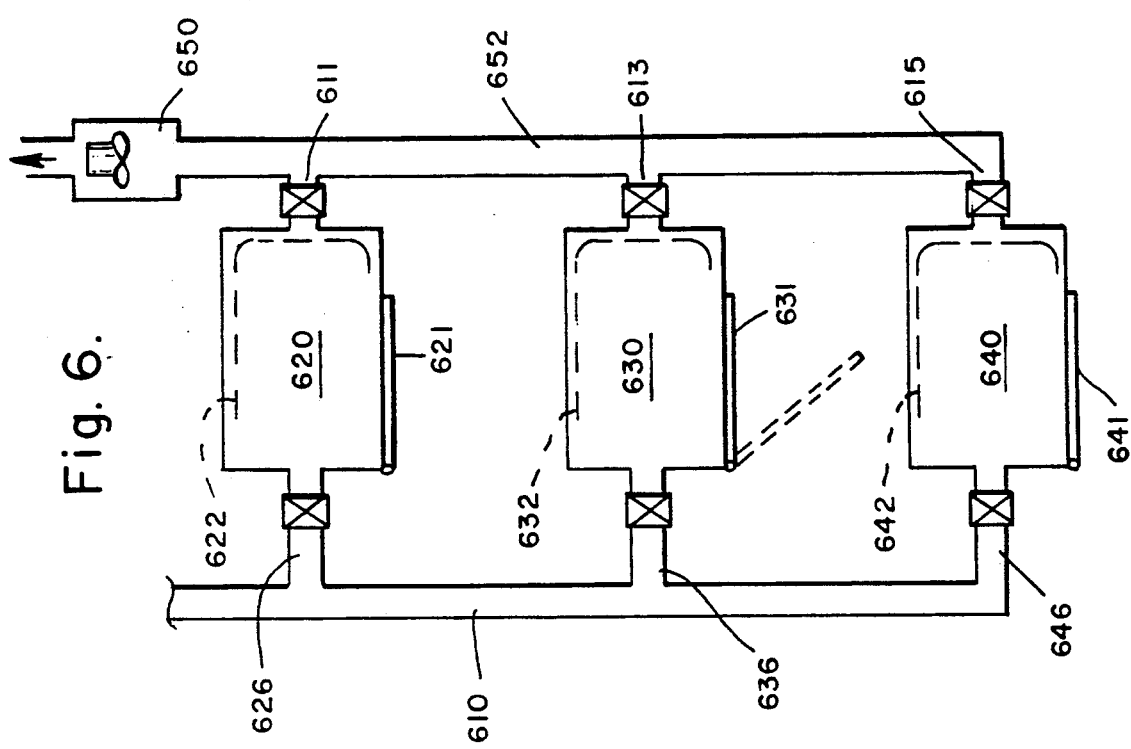
FIG. 6 is a perspective view of one alternative stacking arrangement of the multiplicity of canisters of the present invention vacuum cleaner.
Figure 8:
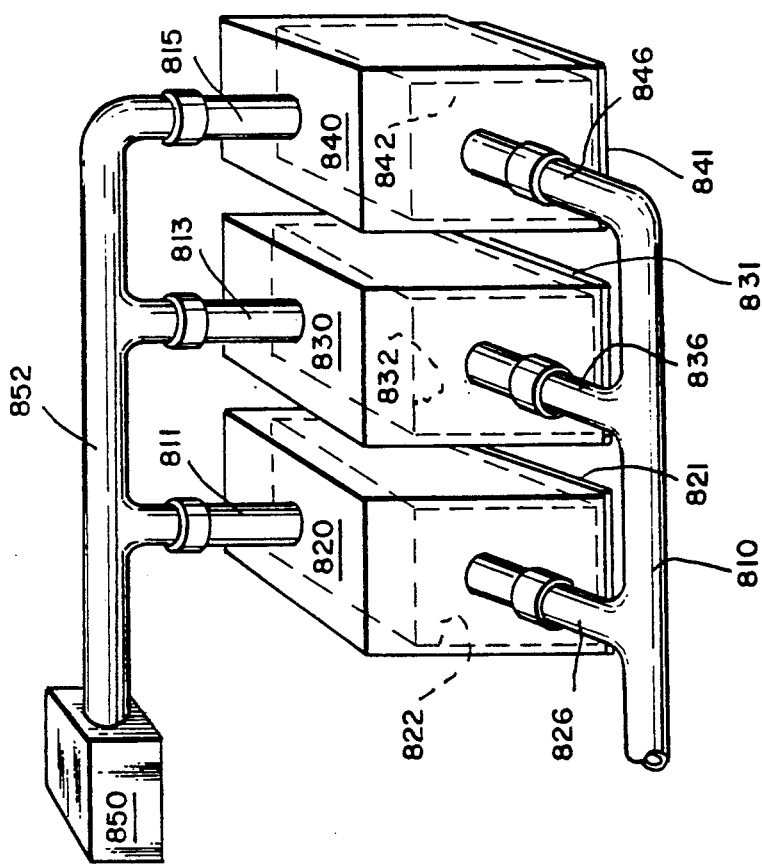
FIG. 8 is a perspective view of an additional alternative stacking arrangement of the multiplicity of canisters of the present invention vacuum cleaner.
Figure 7:
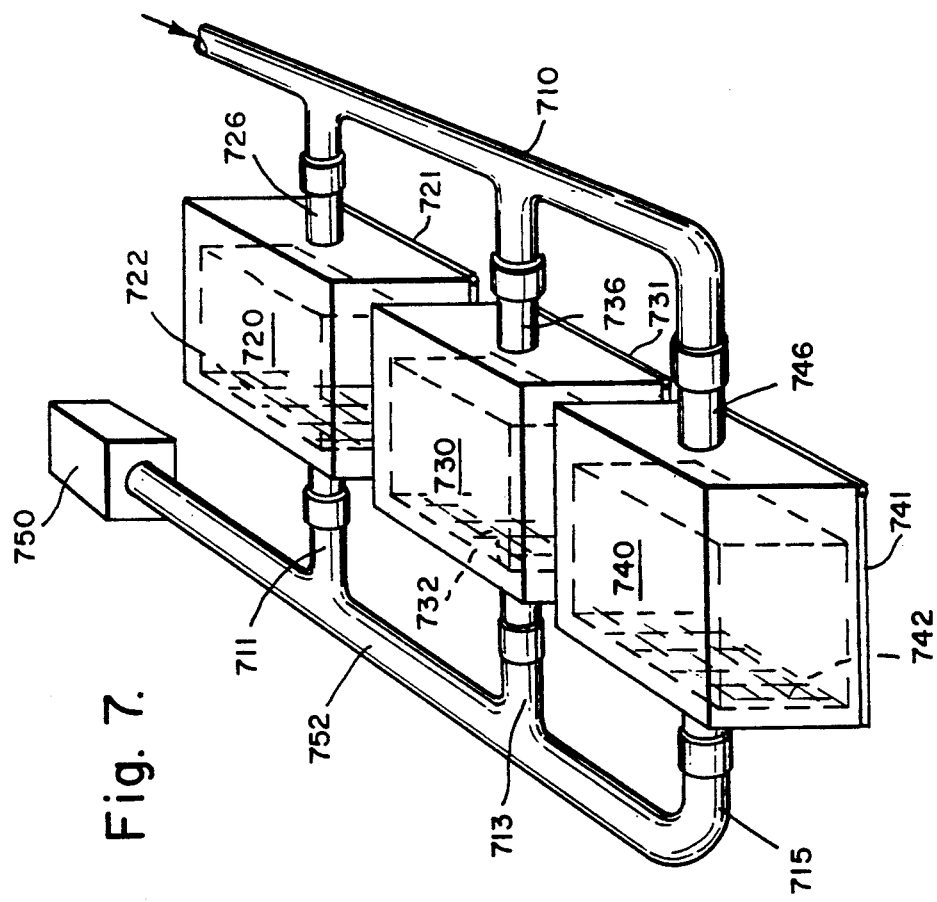
FIG. 7 is a perspective view of another alternative stacking arrangement of the multiplicity of canisters of the present invention vacuum cleaner.

In the embodiments illustrated in FIGS. 2 through 5, the canisters were all individually vertically oriented with the filter bag also vertically oriented so that the dirty air went into the canister from top to bottom and against the filter. The canisters were horizontally aligned side by side. It is also possible to stack the canisters in different orientations, as illustrated in FIGS. 6 through 8. Referring to FIG. 6, there are three canisters 620, 630 and 640 with respective filters 622, 632 and 642 with dirty air inlet passage 610 and return air tube 652 leading to motor 650. There are also dirty air canister inlet tubes 626, 636 and 646 leading to each respective canister and clean air canister exit tubes 611, 613 and 615 respectively. Each canister is stacked vertically, with each filter essentially vertically aligned. There is also a hinged door 621, 631 and 641 at the bottom of each canister respectively, which may be opened to let dirt out without requiring filter removal. To promote accumulation of dirt in the most distal chamber 640, it should be on the bottom. Thus gravity will help to deposit dirt there, especially large particles. The canisters 620, 630 and 640 need to be supported so that the top and middle canister will not collapse upon removal or replacement of the distal or bottom canister.

Referring to FIG. 7, there are three canisters 720, 730 and 740 with respective filters 722, 732 and 742 with dirty air inlet passage 710 and return air tube 752 leading to motor 750. There are also dirty air canister inlet tubes 726, 736 and 746 leading to each respective canister and clean air canister exit tubes 711, 713 and 715 respectively. Each canister is stacked horizontally, with each filter essentially vertically positioned. There is also a hinged door 721, 731 and 741 at the bottom of each canister respectively, which may be opened to let dirt out without requiring filter removal. The canister inlet and canister outlet tubes, 726, 736, 746; 711, 713 and 715 respectively are horizontally aligned rather than vertically aligned.

Referring to FIG. 8, there are three canisters 820, 830 and 840 with respective filters 822, 832 and 842 with dirty air inlet passage 810 and return air tube 852 leading to motor 850. There are also dirty air canister inlet tubes 826, 836 and 846 leading to each respective canister and clean air canister exit tubes 811, 813 and 815 respectively. Each canister is placed side by side vertically, with each filter essentially horizontally aligned and upside down. There is also a hinged door 821, 831 and 841 at the bottom of each canister respectively, which may be opened to let dirt out without requiring filter removal. The canister inlet tubes, 826, 836, 846, are horizontally aligned while the canister outlet tubes 811, 813 and 815 respectively are vertically aligned. The filters are placed "upside down" so that dirt can fall by gravity to the bottom after termination of the vacuuming process.

In all of the embodiments of the present invention, rather than replacing an entire canister when it is filled, it is also within the spirit and scope of the present invention to merely replace the filter of the canister. Alternatively, the canisters themselves can be disposable canisters and so the entire canister can be removed and replaced with a clean canister.

Figure 9:
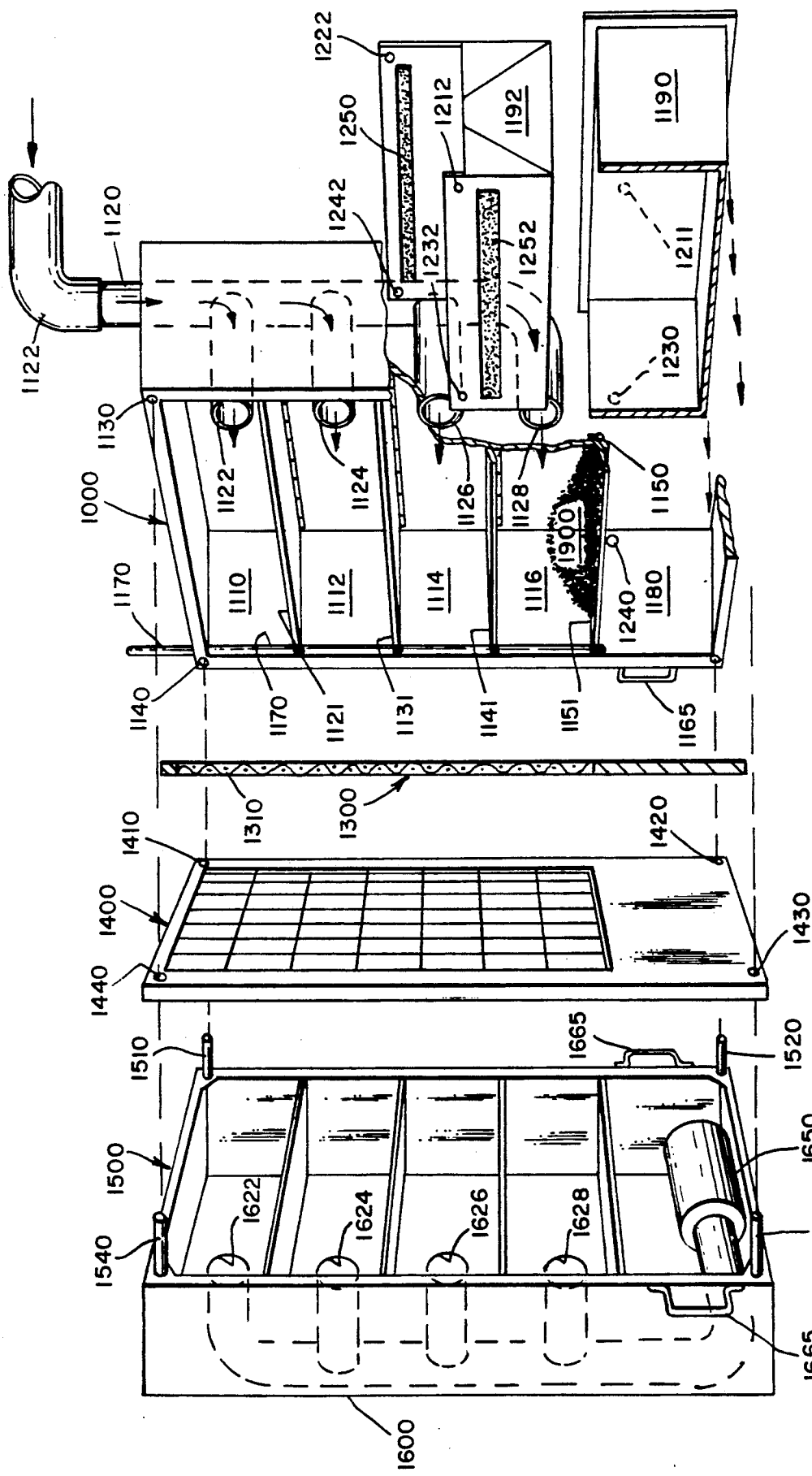
FIG. 9 is a perspective view of an alternative arrangement and embodiment of a vacuum cleaner in the opened position, and utilizing compartments within one housing as opposed to a multiplicity of canisters, and utilizing a single sheet filter to filter all of the compartments.

Referring to FIG. 9, there is another alternative embodiment wherein there are separate chambers interconnected by the dirty and clean air fluid hoses but the filter member is of one sheet and is not embodied in separate bags or separate flat sheets. One advantage of this arrangement is that a flat sheet of filter membrane is easy to install and remove. Most consumers do not like to change dirty vacuum bags because: 1) of recirculation of dirt into the environment; 2) dirty bags are hard to remove from the vacuum cleaner body; 3) clean bags are often hard to insert into the vacuum cleaner body properly; 4) multiple changes and disposal of dirty bags are time consuming and expensive. This design overcomes all above problems by providing: 1) self-sealing bag when the drawer is pulled open so that when the sealed bag containing dirt is removed from the drawer, no dirt is spilt or puffed back into the air; 2) the benefit that the filter does not need to be changed every time unless the consumer wants to. Dirt is removed from the filter by gravity and by the movement of the collapsible chamber floors into the collection bag inside the drawer; 3) for a filter which is a flat sheet with holes in the four corners for easy insertion into the four corresponding pegs on the clean fluid cabinet side; 4) the design of the top of the cabinet-shaped vacuum cleaner allows the flat top surface to be used for other purposes, e.g. temporarily placing tools or toys as the floor is vacuumed; 5) collection of dirt in the bottom chamber first, with all the benefits of a high flow rate, low resistance vaccum cleaner; 6) dirt from all chambers are removed at the same time.

The embodiment of FIG. 9 comprises a cabinet shaped vacuum cleaner with two halves. Dirty fluid cabinet side 1000 includes dirty fluid inlet connector 1120 with inlet hose 1122. Dirty fluid inlet connector 1120 is shown as a tube leading to four dirty air chamber inlet tubes with respective openings 1122, 1124, 1126, 1128 into each of the four chambers, 1110, 1112, 1114, 1116 respectively. The distal chamber 1116 (farthest away from inlet 1120) is thus the bottom chamber. There is a solid flat surface 1130 on top and the other three vertical sides. Chambers 1110, 1112, 1114, 1116 each open toward the filter 1300. Hinge 1150 is the hinge for the chamber floor 1151 which is held in the horizontal position by a flexible rod or string 1170. When vertical rod or string 1170 is loosened or lowered from the ceiling 1130, floor 1151 as well as the chamber floors above it (1141, 1131, 1121), all collapse into the vertical position and allow collected dirt 1900 to fall into a disposable bag inside drawer 1190. Drawer 1190 is inside collection chamber 1180 during the vacuuming process.

Dirty fluid cabinet side 1000 is hinged to clean fluid cabinet side 1500 by vertical hinge 1140. Ledges 1665 and 1165 allow clean fluid cabinet 1500 to close tightly onto dirty fluid cabinet 1000 with filter 1300 sandwiched in between. Filter 1300 is flat and has four holes or other attachment means 1310, 1320, 1330, and 1340 at four corners or along the edges for attachment to clean fluid cabinet side 1500. Wire gauze support 1400 similarly has four holes or other support means 1410, 1420, 1430 and 1440 for attachment to pegs 1510, 1520, 1530 and 1540. The wire gauze support 1400 prevents the fragile filter membrane 1300 from tearing or breaking when the vacuum cleaner is turned on.

Clean fluid cabinet side 1500 has a corresponding number of chambers which are closely fit to the dirty fluid chambers. The floors are, however, fixed and not moveable. Clean air chamber exit tubes 1622, 1624, 1626, 1628 are shown as tubes for illustration purposes. To decrease resistance, the cross sectional area of clean air chamber outlets 1622, 1624, 1626, 1628 should be as large as possible, possibly occupying the majority of the back vertical surface 1600 of the clean-air cabinet and then all the clean air is allowed to pass all the way down from top to the bottom where the motor 1650 is situated. Even though the motor is closest to the distal chamber (which is the bottom chamber), comparable to FIG. 3 arrangement, it is not causing a problem because we do not need to remove any chambers or canisters in this design.

After a significant amount of dirt fills up the bottom distal chamber, it starts to fill the next distal (the next higher up) chamber and so on. The arrangement with multiple chambers is still more efficient than a single chamber with an identical filter surface-area. In this design, all dirt is removed at the same time regardless of which chamber they are in. The flexible rod or string 1170 is attached to all the chamber floors in such a way that movement of string 1170 downward allows all of the collapsible chamber floors to collapse together. As a result, all the dirt goes to the collection bag 1192 in drawer 1190 at the same time. Drawer 1190 has a handle to pull it out from dirt-collection chamber 1180. Snap-on buttons 1210 and 1230 are situated at the inner upper corners of drawer 1190.

Collection bag 1192 is made of impermeable and light material with four snap-on buttons. The drawer 1190 should be partially inserted inside chamber 1180 before the collection bag 1192 is snapped onto the respective male snap-on buttons in the drawer in the cabinet collection chamber wall. Female snap-on button 1212 snaps onto male snap-on button 1211 in drawer 1190. Female snap-on button 1232 snaps onto male snap-on button 1230 in drawer 1190. Female snap-on button 1222 snaps onto a male snap-on button on the wall of the collection chamber 1180. Female snap-on button 1242 snaps onto male snap-on button 1240 on the other wall of the collection chamber 1180. The bag 1192 will remain open and ready to receive dirt when it is placed into the drawer 1190 with the drawer 1190 at a position of being partially inserted into the dirt-collection compartment 1180.

The bag 1192 also has two velcro strips which are distant and apart from each other when the bag is snapped onto the male buttons within the drawer and on the walls of the collection chamber. After dirt is allowed to fall into the open bag, the rod or string 1170 is lifted up again to move the chamber floors onto a horizontal position and to lock them temporarily in that position to allow withdrawal of the drawer 119. When the drawer is withdrawn from the collection chamber, the velcro 1250 will be opposed to velcro 1252 and thus will seal the bag and its contents before the entire bag is removed from the drawer.

Referring to FIG. 10, there is shown an alternative embodiment of the present invention which provides a special structure 2000 which has a multiplicity of compartments and is adapted to the size and shape of a generally cylindrical filter bag, so a conventional vacuum cleaner system with a generally cylindrical canister for containing the generally cylindrical filter bag can be converted into a multi-chamber vacuum system. A dirty fluid inlet passage 2010 is attached to a generally circular dirty fluid conduit which is formed by a solid circular disc top 2020 connected to a central cylindrical structure 2040. The conduit has a solid side wall 2030 to guide dirty fluid into a filter bag first in a horizontal circular pathway before going downward into the different compartments. There are several compartment walls which form the compartments. By way of example, there are six compartment walls 2110, 2120, 2130, 2140, 2150 and 2160 to form six compartments 2210, 2220, 2230, 2240, 2250 and 2260 respectively. First compartment wall 2110 is different than the others in that it reaches to the top of the conduit so that it prevents the dirty fluid from exiting except downward toward the filter bag. The other compartment walls, 2120, 2130, 2140, 2150 and 2160 do not reach to the top of the conduit to leave a gap so that dirty fluid can pass all the way through the horizontal circular pathway until blocked by top part of compartment wall 2110. With this design compartment 2260 is the most distal compartment which is expected to be filled up first with particulates carried by the dirty fluid. Subsequently, the other compartments will be filled up according to the dynamics discussed in previous embodiments. Of course more or less than six compartments may be constructed.

The multi-compartment structure 2000 is snugly fitted into the filter bag 2400. Filter bag 2400 has a side wall 2410, an open top 2412 for receiving dirty fluid and a bottom 2414. The compartment walls of structure 2000 are adapted to fit tightly inside the filter 2400 bag against the side wall 2410 and the bottom 2414 of the filter bag 2400 to form compartments without air-leaks between the neighboring compartments. The edge of the top 2412 of the filter bag 2400 when properly assembled, will reach up to at least the level of 2035 which is the highest point of the second to sixth compartment walls.

After the multi-compartment structure 2000 is assembled in the filter bag 2400, they are installed inside a cylindrical canister 2500 of the vacuum system. Cylindrical canister 2500 has a solid side wall 2510, an open top 2512 and a solid bottom 2514. On bottom 2514 there is an opening 2516 which is substantially larger than the cross-sectional area of the central cylindrical structure 2040 of the top structure 2000, but leaves enough space along the circular edge of the bottom 2514 adjacent to the side wall 2510 to support filter bag 2400. A return air tube 2610 is connected to the opening 2516 through a conical shaped connector 2612 and leads to motor 2650. Top structure 2000 also has a pair of means 2019 for attachment to a corresponding pair of means 2519 on the canister 2500 to secure an air-tight installation. After the filter bag 2400 has been filled with enough particulates, the top structure 2000 can be lifted out and the filter bag 2400 can be removed. Alternatively, the compartment wall structure can be connected with disposable material, in which case the filter bag 2400 can be disposed of without taking out the compartment wall structure and without disturbing the dirt back into the atmosphere. It is also conceivable that the entire set-up 2500, 2400 and 2000 be oriented up-side down with opening 2412 facing downward so that dirt can fall away from the filter surface when the machine is turned off, which may further increase the efficiency of the system when the vacuum cleaner is turned on again before filter change.

The present invention is an improvement of the vacuum cleaner with uninterrupted and undiminished performance as disclosed in the '414 application. The similarities between the present invention and the device in the '414 application are as follows: (1) a multiplicity of filters, each of which is used to collect dirt; located within a multiplicity of canisters; (2) the filter or the canisters holding the filters can be detached from the entire apparatus; (3) vacuuming can continue while one or more filters or canisters are disconnected; (4) different filters fill up with dirt or particulates at different rates and at different times: (5) the ability to automatically shift the filtration process to less obstructed areas of the apparatus such as the next filter when a used filter becomes less efficient for filtration; (6) there is no limit to the capacity of the apparatus as long as the filled canisters or filters are replaced in an efficient and timely manner; (7) the suction or vacuuming power is superior to conventional designs where a single filter membrane or bag in a single chamber soon becomes obstructed by dirt and becomes inefficient; (8) the continuous vacuuming power being kept on prevents recirculation of dirt back to the environment while filled bags are replaced; (9) the number of vacuum filter chambers is unlimited; and (10) positive pressure pushes particulates onto the filter surface.

While there are substantial similarities as discussed above, there are also some very important differences between the device in the '414 application and the improvements of the present invention. The major differences are as follows: (1) in the '414 application, the device has the multiplicity of filter chambers with the pathway of the dirty fluid connected in series while in the present invention the pathway of the dirty fluid flowing into the multiplicity of filter chambers are connected in parallel; (2) in the '414 application the device suffers from the defect that obstruction of any point in the pathway of the dirty fluid stops the flow of dirty fluid to sites beyond the obstruction while in the present invention the obstruction of some points in the pathway of dirty fluid does not stop movement of dirty fluid to distal parts of the system; (3) in the '414 application device, when a chamber is progressively filled up and resistance builds up, negative pressure will exceed positive pressure toward the filter membrane and will move the particulates onto the next chamber. Material deposited in one chamber near a dirty fluid outlet had a high probability of transfer to the next chamber. In contrast, in the present invention, when one chamber is ineffective in filtration, the dirty fluid is automatically by-passed to the next chamber. Negative pressure in the almost-filled chamber is probably negligible. Material in one chamber has a low probability of transfer to the next chamber; (4) in the '414 application device, particulates have to travel a long distance to the last chamber and must pass through all of the previous chambers before getting there, while in the present invention the particulates can bypass all previous chambers and go directly to the last chamber; (5) in the '414 application device, the first or most proximal chamber is expected to fill up first and ahead of the more distal chambers while in the present invention the last or most distal chamber is expected to fill up first; (6) in the '414 application device the flow rate through all chambers are governed by the formula: Flow equals Pressure Difference divided by Resistance. Material will tend to be deposited in the first chamber because of the lowest resistance and highest pressure gradient there. In the present invention, although the flow rate through a given chamber is governed by the same formula, flow rates into different chambers are greatly influenced by secondary factors such as rate of flow of fluid at the inlet tubing of each chamber and the angle of inlet connection to the respective chambers, which creates preferential higher delivery of dirty fluid to some preferred chamber; (7) in the '414 application device the rate of deposit of material in various chambers is more predictable because of the progressive change of pressure and resistance in an in-series arrangement and the possibility of equilibration of material via transfer of material from one chamber to the next while in the present invention, the rate of deposit of material in different chambers is harder to predict since the chamber with the highest flow or filtration rate will build up resistance fastest, thereafter promoting diversion of material to other chambers, without removing material already collected in the high resistance chamber; (8) in the '414 application device the possibility of transfer of material from one chamber to the next can cause more agitation of material while in the present invention there is less agitation of material which tends to stay in the same chamber after being retained there; (9) in the '414 application device there is less capacity for dirt per bag because some space is needed between the inlet and the outlet (for dirty fluid) for the dirty fluid to pass from the dirty fluid inlet to the dirty fluid outlet and onto the next chamber. The negative pressure removing material away from the almost-filled-up chamber creates this space. If the negative pressure is insufficient to transfer material to the next chamber, the more proximal chamber will be completely obstructed and the next chamber will get no dirty fluid, while in the present invention all proximal chambers can be completely filled up to the brim, without obstruction of dirty fluid delivery to the more distal chambers; (10) in the '414 application device, the first chamber is filled first while in the present invention the last chamber is filled first; (10) in the '414 application device, the first chamber is closest to the motor and therefore it is least convenient to change the filter or disconnect the canister while in the present invention the last chamber is farthest away from the motor and therefore the most convenient to disconnect and clean; (12) in the '414 application device there are at least three disconnect points (one along the dirty inlet, one along the dirty outlet and one along the clean fluid outlet pathway) needed to replace the first filter chamber or canister while in the present invention only two disconnect points (one along the canister inlet and one along the canister outlet) are needed to replace each filter chamber or canister; (13) in the '414 application device, there is negative pressure pulling particulates away from each filter membrane in addition to positive pressure pushing the particulates onto each filter membrane while in the present invention there is primarily only positive pressure pushing particulates onto the filter membrane.

Defined broadly, the present invention is a vacuum cleaner comprising: (a) a vacuum suction source; (b) a fluid return tube leading to said vacuum suction source; (c) a dirty fluid inlet tube; (d) a multiplicity of vacuum cleaner canisters, each vacuum cleaner canister having an interior chamber containing a filter means, a canister inlet tube leading from said dirty fluid inlet tube to the interior chamber of the canister and a canister exit tube leading from the interior chamber of the canister to said fluid return tube, with each vacuum cleaner canister connected in parallel between the dirty fluid inlet tube and fluid return tube so that fluid may simultaneously flow through all vacuum cleaner canisters; (e) means for shutting off the flow of fluid to one or more of said multiplicity of canisters such that fluid continues to flow through the remaining canisters to which fluid flow has not been shut off; and (f) optional means for disengaging each of said multiplicity of canisters such that the remaining canisters which have not been disengaged continue to operate and have fluid flow through them.

The present invention is also defined as a method of filtering fluid including particulates comprising: causing said fluid to pass through a multiplicity of filtering canisters aligned in parallel such that a selected one of the filtering canisters will collect particulates in the fluid and become significantly filled with the particulates before the next filter canister begins to function as a filtering apparatus and the in parallel connections permits a subset of the multiplicity of filter canisters to continue to operate if fluid flow to a portion of the filter canisters is unintentionally occluded or shut off intentionally.

The method further comprises removing a filtering canister which has become filled with particulates while enabling the filtering to continue through the remaining filtering canisters without stopping the filtering process.

The method further comprises replacing a filtering canister which has become filled with particulates while enabling the filtering to continue through the remaining filtering canisters without stopping the filtering process.

The present invention is also defined as a vacuum cleaner comprising: (a) a vacuum suction source; (b) a fluid return tube leading to said vacuum suction source; (c) a dirty fluid inlet tube; (d) a housing having two hingably joined sections, the housing including a multiplicity of vacuum cleaner compartments, a filter means extending across all of the multiplicity of vacuum cleaner compartments, a multiplicity of chamber inlet tubes with a respective one chamber inlet tube leading from said dirty fluid inlet tube to a respective one of the vacuum cleaner compartments, a multiplicity of chamber exit tubes with a respective one chamber exit tube leading from a respective one of the vacuum cleaner compartments to said fluid return tube, with each vacuum cleaner compartment connected in parallel between the dirty fluid inlet tube and fluid return tube so that fluid may simultaneously flow through all vacuum cleaner compartments; (e) receptacle means for receiving dirt and debris which has accumulated in said multiplicity of vacuum cleaner compartments; and (f) means for causing dirt and debris accumulated in each of said vacuum cleaner compartments to be transported into said receptacle means.

DESCRIPTION OF EXPERIMENTS TO SUPPORT THE THEORIES OF THE PRESENT INVENTION

In general, three canisters are modified from commercially available Eureka Mightymite model 3110 Type B canisters with custom-made air-tight lids allowing air-tight fittings for the appropriate hose connections as illustrated in FIGS. 1 or 2. The canisters are mounted on a wooden frame for easy removal of tubings and connections. Except as otherwise stated, the vacuum source is provided by one Panasonic let-flo Model MC-2200 vacuum cleaner (without filter bags) with 5.0 Amp current.

It was found that measurement of "cm-water pull" with a pressure gauge was a poor method to measure the ability of a vacuum cleaner to pick up dirt from a surface. Even when the vacuum bag was almost full and little dirt was picked up by the vacuum cleaner (indicating minimal flow of dirt into the vacuum cleaner), the pressure gauge applied to the inlet hose still registered a high "negative pressure" (such as 56 cm water) as compared to measurements made with a clean filter bag (57.5 cm water) in place. The reason was probably related to the fact that as long as the filter surface still had a few pores left unobstructed by dirt, the vacuum (pressure) within the vacuum cleaner chamber expressed as (cm of water or mm of mercury below atmospheric pressure) would still reflect the pulling force of the motor. A pressure gauge therefore only measures the pressure gradient available to pull any dirt; it gives no consideration to the resistance of the system. A high resistance will negate the expected benefit of a high pressure gradient because the resultant flow rate is reduced. Only high flow rate will sweep up dirt and allow a vacuum cleaner to perform with high efficiency.

A sensitive vacuum performance test was used as follows, which accurately reflects the flow of dirt or particulates into the vacuum cleaner. An 8 inch pie pan (one inch deep) was filled with a pre-weighed amount of flour and smoothened flat with a cardboard. Typically 360 gm of flour would fill it to the brim. The inlet hose was mounted to a hole in the center of a piece of wooden board which was about 20 inches long and 2.5 inches wide. The tip of the inlet hose was flush with the bottom of the wooden board which could glide against the rim of the pie pan. This arrangement ensured that the hose could suck up flour from the entire surface inside the pie pan, but would do so from a constant distance from the bottom of the pie pan.

Because most consumers unload the bag only after completion of the job and the bag accumulates more dirt as the job continues, we designed the experiment to see how much flour the system could pick up at different amounts of preload, i.e. flour already inside the vacuum bags (causing partial obstructions there).

The vacuum cleaner system as illustrated in FIG. 2 was turned on throughout the experiment until all the chambers were almost completely filled.

Typically the pie pan was filled with 360 gm of flour. All vacuum performance tests were done by vacuuming flour into the vacuum system for at least three minutes. The great majority of flour that would eventually enter the vacuum system typically was sucked up within the first half minute. After three minutes, the amount of flour removed ("vacuum performance" at that preload) was measured by subtraction of the amount left from the starting amount of flour. Then the rest of the 360 gm of flour was all sucked into the system. After this time point the "preload" would be 360 gm.

The process was repeated. After another 360 gm of flour was sucked into the system, the preload would be 720 gm. The process was repeated at various preloads until all the chambers were filled, or when obviously minimal amounts of flour could be sucked into the vacuum system.

For distribution studies, the amount to be loaded was all sucked into the system before the bags were removed and individually weighed to measure the amount of flour in each bag. New bags were used each time.

Experiment One showed that with a "One Chamber Arrangement" (by deliberate obstruction at 212), the vacuum performance drastically droped after 720 gm of flour had been preloaded into the system.

Vacuum performance was defined as the amount of flour that the system could suck into the system within three minutes at a constant distance (one inch) from the bottom of the pie pan, starting with 360 gm of flour in the pie pan. It was a sensitive method in that when the vacuum system was fresh and all three filter bags were new and clean, the system could pick up a lot of flour which quickly increased the distance between the inlet hose and the top of the flour level. As a greater distance was created by suction of flour into the system, more clean air from the environment was entrained into the system and less flour would be picked up, until the system was not capable of picking up more flour. As the system became loaded with flour, the filtration system became less efficient (probably because fewer open pores were available) and so even though the hose was almost touching the top level of the full 360 gm of flour at the beginning of the three minute time interval, little flour was picked up. So the system tended to under-estimate the amount of dirt that could be picked up when it was at high efficiency because we allowed the distance between the hose and the flour to increase. (In normal performance of a vacuum cleaner, the distance between the floor and the suction apparatus remains constant at all times even though efficiency decreases with increased time and load inside the system.) This under-estimation is useful because if the vacuum cleaner is powerful and in a highly efficient state, under-estimation of its ability is not a serious problem. On the other hand, when the system had been pre-loaded with a large amount of particulate matter which would decrease its efficiency, the amount of flour removed was minimal during the entire three minutes and so the distance between the hose and the top of the flour level remained short. So, if the vacuum-performance drops, the system really has become very inefficient in picking up dirt. This low-performance state is the area we are interested in improving. Therefore the amount of flour removed by this method is a sensitive method of assessing the ability of the system to pick up dirt from the carpet.

Efficiency drop level is defined as the pre-load at which the vacuum system can pick up less than 50% of the amount of flour as compared to a zero pre-load condition., i.e. the pre-load at which the system operates at 50% vacuum performance level.

Experiment 1 showed the vacuum performance of the system using one chamber, or two chambers in parallel arrangement, and three chambers in parallel arrangement such as in FIG. 2. Each experiment was performed twice (e.g. A and B in one-chamber arrangment; C and D in two-chamber arrangement; E and F in three-chamber arrangement).

In the one-chamber arrangement, tube 212 was deliberately completely obstructed so that the rest of the system was unchanged. The maximum capacity of the filter bag was approximately 1500 gm plus or minus 100 gm of flour. Efficiency drop level for one-chamber was 720 gm of pre-load. In other words, the efficiency of the system drops drastically when it is less than half capacity.

In the two-chamber arrangement, only tube 214 was completely obstructed. Efficiency drop level occurred at 2520 gm of preload condition. In other words, the efficiency drops drastically when the system has been loaded to approximately 84% of capacity (2520 gm divided by $2 \times 1500$ gm).

In the three-chamber arrangement, all connections were patent. Efficiency drop level occurred at 3960 gm of pre-load. The system has been improved to the point where efficiency of vacuuming drops only at 88% of capacity (3960 gm divided by $3 \times 1500$ gm).

Experiment 2 verified that improvements could be made when a two-chamber system was filled to capacity by addition of a more distal third new chamber. Again tube 214 was temporarily turned off before 2160 gm of flour was preloaded into the two-chamber system. Vacuum performance was consistent with all previous data using two-chambers. At preload of 2880 gm, vacuum performance dropped to 71 gm. After the 71 gm of flour has entered into the system (making it now a preload of $2880+71=2951$ gm), tube 214 was turned on to the open position and immediately vacuum performance jumped to 163 gm, which was similar to the vacuum performance of a three-chamber system with preload of 1080 gm to 2880 gm. In other words, the entire system behaved as if it had only 1080 gm of preload when it actually had 2951 gm of preload. The efficiency drop level was reached only with pre-load of 4031 gm. The third chamber took in another 1080 gm of flour (4031 minus 2951) before its efficiency dropped, which was better than even the one-chamber system starting from a new bag (efficiency drop level was reached at 720 gm).

Experiment 3 showed the distribution of flour in various chambers arranged in parallel.

In the two-chamber arrangement, it appeared that the distal chamber got more flour initially, until 358 or more gm of flour was collected. Thereafter, the resistance in the distal chamber was increased such that subsequent vacuuming got more flour into the proximal chamber. When sufficient resistance built up in the proximal chamber, the flour again went to the distal chamber, ending (at 2880 gm load) with more flour in the distal chamber than in the proximal chamber. The sum of the weight of flour in proximal and distal chambers was not always equal to the sum of all flour removed from the pie pan because some flour was trapped in the corrugated tubings and hoses which might be released in a subsequent experiment, to be distributed between the two chambers.

In the three-chamber experiment, again the flour initially was sucked preferentially into the distal chamber. There was consistently more flour in the proximal chamber than the middle chamber before pre-load 1440 was reached because until then, the proximal chamber probably had less resistance and perhaps greater pressure gradient across it than the middle chamber. It appeared that when approximately 655 gm of flour had been collected in the distal chamber, the resistance was built up to such a point that flow to the middle chamber was almost the same as the flow into the distal chamber. After approximately double the amount was collected in both distal and middle chamber (i.e. approximately 1297 to 1102 gm), their resistance had built up such that flour started to pour into the proximate chamber and began to build up there until even the first chamber became full (1243 gm).

This experiment suggests that several factors affect preferential loading to the distal chamber. Initially the most distal chamber is favored because the angle of the inlet hoses to the chambers has primary importance in determining where the dirt goes. Subsequently the resistance inside the most distal chamber will build up, which will in turn promote loading into the next most distal chamber. The level of dirt will rise in a similar rate in these two most distal chambers until the resistance of the two most distal chambers is such that the third most distal chamber will get preferential loading of dirt. It is expected that when its resistance catches up to the two most distal chambers, all three distal chambers will rise at similar rates until the fourth most distal chamber gets preferential loading etc. (in a model with more than four chambers, for example).

Experiment 4 showed the vacuum performance of three chambers arranged in the in-series arrangement. Again the efficiency drop level occurred only at 4320 gm which was almost 96% of capacity (4320 divided by $3 \times 1500$ gm). It was interesting to note that the vacuum performance dropped in both experiment A and B (137 and 136 gm—1440 and 1080 preload) at a time when the proximal chamber was expected to be full. This suggests that the dirty fluid outlet of the proximal chamber leading to the next chamber was temporarily obstructed. Continuous vacuuming cleared some of the flour by transfer to the middle chamber which provided additional filtration surface to improve the vacuum performance again.

Experiment 5 showed the distribution of flour in the various chambers arranged in the in-series arragement. As discussed, the flour tended to accumulate in the most proximal chamber and then the next, with the most distal chamber getting the least amount of flour.

Experiment 6 showed that increasing the vacuum source to two times 5.0 amperes did not significantly improve the vacuum performance of the one- chamber arrangement. This showed that the limitation of the system was not due to the low horse power or ampherage of the motor but that the filter was the limiting factor. This means that a less power consuming motor (less noisy also) can be used to achieve better dirt-picking ability by using a multi-chamber arrangement to improve the filtration efficiency.

MULTI-CHAMBER LOW-RESISTANCE VACUUM CLEANER

EXPERIMENT 1: VACUUM PERFORMANCE USING DIFFERENT NUMBERS OF CHAMBERS CONNECTED IN PARALLEL ARRANGEMENT

| PRELOAD GM | ONE CHAMBER | | TWO CHAMBERS | | THREE CHAMBERS | |
|---|---|---|---|---|---|---|
|  | A | B | C | D | E | F |
| 0 | 160 | 163 | 200 | 190 | 173 | 183 |
| 360 | 161 | 147 | 168 | 185 | 149 | 197 |
| 720 | 100 | 71 | 177 | 165 | 157 | 202 |
| 1080 | 43 | 71 | 162 | 159 | 146 | 175 |
| 1440 | ND | ND | 123 | 133 | 153 | 171 |
| 1880 | | | 113 | 116 | 165 | 181 |
| 2160 | | | 83 | 103 | 145 | 162 |
| 2520 | | | 63 | 63 | 127 | 147 |
| 2880 | | | 47 | 30 | 135 | 152 |
| 3240 | | | ND | ND | 128 | 139 |
| 3600 | | | | | 83 | 93 |
| 3960 | | | | | 68 | 100 |
| 4320 | | | | | 35 | 86 |

ND = not done due to slow flow rate.

EXPERIMENT 2: IMPROVEMENT OF VACUUM PERFORMANCE AFTER TWO-CHAMBERS WERE FULL, BY ADDITION OF NEW EMPTY THIRD DISTAL CHAMBER CONNECTED IN PARALLEL ARRANGEMENT.

| PRELOAD GM | NUMBER OF CHAMBERS | GMS OF FLOUR VACUUMED |
|---|---|---|
| 2160 | 2 | 131 |
| 2520 | 2 | 125 |
| 2880 | 2 | 71 |
| 2951 | 2 + 1 | 163 |
| 3311 | 2 + 1 | 165 |
| 3731 | 2 + 1 | 119 |
| 4031 | 2 + 1 | 87 |
| 4391 | 2 + 1 | 83 |

EXPERIMENT 3: DISTRIBUTION OF FLOUR IN THE VARIOUS CHAMBERS CONNECTED IN PARALLEL ARRANGEMENT

| LOAD Gm | TWO CHAMBERS | | THREE CHAMBERS | | |
|---|---|---|---|---|---|
|  | PROXIMAL | DISTAL | PROXIMAL | MIDDLE | DISTAL |
| 360 | 58 | 273 | 82 | 38 | 242 |
| 540 | 263 | 358 | NM | NM | NM |
| 720 | 475 | 375 | 153 | 80 | 479 |
| 1080 | 610 | 481 | 224 | 157 | 655 |
| 1440 | NM | NM | 231 | 554 | 570 |
| 1800 | 1023 | 745 | NM | NM | NM |
| 2160 | NM | NM | 357 | 898 | 784 |
| 2880 | 1171 | 1636 | 452 | 1102 | 1297 |
| 4320 | ND | ND | 1243 | 1343 | 1604 |

NM = Not Measured.
ND = not done due to slow flow rate.

EXPERIMENT 4: VACUUM PERFORMANCE USING THREE CHAMBERS, IN-SERIES ARRANGEMENT

| PRELOAD GM | GM OF FLOUR VACUUMED | |
|---|---|---|
|  | A | B |
| 0 | 188 | 162 |
| 360 | 172 | 178 |
| 720 | 191 | 177 |
| 1080 | 155 | 136 |
| 1440 | 137 | 171 |
| 1800 | 148 | 175 |
| 2160 | 168 | 163 |
| 2520 | 156 | 162 |
| 2880 | 163 | 161 |
| 3240 | 156 | 150 |
| 3600 | 146 | 133 |
| 3960 | 138 | 142 |
| 4320 | 89 | 81 |

EXPERIMENT 5: DISTRIBUTION OF PARTICULATES IN THE THREE CHAMBERS CONNECTED IN THE IN-SERIES ARRANGEMENT

| LOAD GM | PROXIMAL | MIDDLE | DISTAL |
|---|---|---|---|
| 360 | 225 | 87 | 44 |
| 720 | 358 | 278 | 72 |
| 1080 | 362 | 325 | 284 |
| 1440 | 640 | 504 | 278 |
| 2160 | 921 | 833 | 395 |
| 2880 | 970 | 922 | 976 |
| 4320 | 1490 | 1362 | 1441 |

EXPERIMENT 6: EFFECT OF DOUBLING THE AMPHERAGE OR POWER OF THE VACUUM SOURCE ON VACUUMING PERFORMANCE USING ONE CHAMBER ARRANGEMENT

| PRELOAD GM | 5.0 AMP | | 2 × 5.0 AMP | |
|---|---|---|---|---|
|  | A | B | C | D |
| 0 | 133 | 131 | 135 | 136 |
| 360 | 114 | 108 | 123 | 115 |
| 720 | 38 | 35 | 97 | 79 |
| 1080 | 8 | 11 | 78 | 52 |

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms of modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. A vacuum cleaner comprising:
   a. a vacuum suction source;
   b. a fluid return tube leading to said vacuum suction source;
   c. a dirty fluid inlet tube;

d. a housing having two hingably joined sections, the housing including a multiplicity of vacuum cleaner compartments, a filter means extending across all of the multiplicity of vacuum cleaner compartments, a multiplicity of compartment inlet tubes with a respective one compartment inlet tube leading from said dirty fluid inlet tube to a respective one of the vacuum cleaner compartments, a multiplicity of compartment exit tubes with a respective one compartment exit tube leading from a respective one of the vacuum cleaner compartments to said fluid return tube, with each vacuum cleaner compartment connected in parallel between the dirty fluid inlet tube and fluid return tube so that fluid may simultaneously flow through all vacuum cleaner compartments;

e. receptacle means for receiving particulates which have accumulated in said multiplicity of vacuum cleaner compartments; and f. means for causing particulates accumulated in each of said vacuum cleaner compartments to be transported into said receptacle means.

2. A vacuum cleaner in accordance with claim 1 wherein:

a. said multiplicity of vacuum cleaner compartments are vertically aligned;

b. said receptacle means is set below the lowermost vacuum cleaner compartment;

c. each of said multiplicity of vacuum cleaner compartments have a rotatable floor; and d. means for causing each rotatable floor to rotate toward said receptacle means and thereby cause accumulated dirt and debris to fall into said receptacle means.

3. A vacuum cleaner in accordance with claim 1 wherein said receptacle means further comprises a movable drawer including a removable debris bag.

4. A vacuum cleaner comprising:

a. a vacuum suction source;

b. a housing having a top opening and a bottom opening, a common filter means and a central structure contained inside the housing, where the central structure has partitioning walls to divide the space inside the housing into a multiplicity of adjacent filtering compartments, and the common filter means is a unitary piece configured to be wrapped around the central structure, such that the multiplicity of filtering compartments are commonly covered by the common filter means, so that fluid may simultaneously flow through all filtering compartments;

c. a dirty fluid inlet tube connected to said housing at said top opening; and d. a fluid return tube connected to said housing at said bottom opening and leading to said vacuum suction source.

5. A vacuum cleaner in accordance with claim 4 wherein said housing is generally cylindrical shaped and said central structure further comprises a central attachment site and a multiplicity of non-permeable material radially attached to the central attachment site as said partitioning walls of said adjacent filtering compartments.

6. A method of filtering fluid including particles, comprising:

a. dividing the space inside a housing into a multiplicity of adjacent filtering compartments by placing a central structure with partitioning walls inside the housing;

b. filtering said multiplicity of adjacent filtering compartments with a common filter means which is a unitary piece configured to be wrapped around said central structure; and c. causing the fluid to pass through said multiplicity of adjacent filtering compartments commonly covered by said common filter means, such that each one of said multiplicity of adjacent filtering compartments can collect the particles in the fluid individually even if other ones of said multiplicity of adjacent filtering compartments become occluded.

7. A method of filtering fluid including particles in accordance with claim 6 further comprising causing a selected one of said multiplicity of adjacent filtering compartments to be filled first by the particles in the fluid.

* * * * *